United States Patent [19]

Yee

[11] Patent Number: 5,471,576
[45] Date of Patent: Nov. 28, 1995

[54] AUDIO/VIDEO SYNCHRONIZATION FOR APPLICATION PROGRAMS

[75] Inventor: Raymond L. Yee, Coral Springs, Fla.

[73] Assignee: International Business Machines Corporation, Armonk, N.Y.

[21] Appl. No.: 976,628

[22] Filed: Nov. 16, 1992

[51] Int. Cl.$^6$ .................................................. G06F 13/10
[52] U.S. Cl. ...................................................... 395/154
[58] Field of Search ................................. 395/154, 152; 360/14.1; 371/42; 340/825.14, 825.2; 348/512, 515; 381/124

[56] References Cited

U.S. PATENT DOCUMENTS

| Re. 33,535 | 2/1991 | Cooper | 348/512 |
|---|---|---|---|
| 4,641,253 | 2/1987 | Mastran | 395/154 |
| 4,851,909 | 7/1989 | Noske et al. | 348/512 |
| 4,951,155 | 8/1990 | Andrews | 360/14.1 |
| 5,043,830 | 8/1991 | Nobuhiro | 360/19.1 |
| 5,101,274 | 3/1992 | Yoshimura et al. | 348/482 |
| 5,119,474 | 6/1992 | Beitel et al. | 395/154 |
| 5,230,041 | 7/1993 | Dinwiddie, Jr. et al. | 395/154 |
| 5,274,758 | 12/1993 | Beitel et al. | 395/154 |
| 5,333,299 | 7/1994 | Koval et al. | 395/550 |

OTHER PUBLICATIONS

Southerton, Programmer's Guide to Presentation Manager, pp. 27–32, 1989.
Grunin, L., "Image Compression for PC graphcs: something losses, something gained", PC Magazine, v. 11, n. 8, p. 337(9), Apr. 28, 1992.
Wagstaff, Sean, "QuickTime—sorry action takes over Director's chair", MacWeek, v. 6, n. 29, p. 57, Aug. 10, 1992.

Primary Examiner—Heather R. Herndon
Assistant Examiner—Joseph R. Burwell
Attorney, Agent, or Firm—Bruce D. Jobse; Homer L. Knearl

[57] ABSTRACT

A synchronization process in an application program records audio fields with video synchronization counts, and plays back the audio and video fields in synchronism by tracking the video fields against the video sync counts in the audio fields. The video sync counts correspond to the number of video field processed when the audio field is processed. During recording of audio and video fields for the multimedia presentation, the video fields are counted. The video field count is appended to and recorded with each audio field. During playback, the system compares the count of video fields displayed against the video field count appended to the audio field being presented. If the counts are different, the system either skips video fields, or repeats video fields to bring the video fields into synchronism with the audio fields.

13 Claims, 10 Drawing Sheets

FIG. 2

VIDEO FIELD 1
VIDEO FIELD 2
VIDEO FIELD 3         AUDIO FIELD 1/VSYNC 3
VIDEO FIELD 4
VIDEO FIELD 5
VIDEO FIELD 6
VIDEO FIELD 7         AUDIO FIELD 2/VSYNC 7
VIDEO FIELD 8
VIDEO FIELD 9
VIDEO FIELD 10        AUDIO FIELD 3/VSYNC 10
VIDEO FIELD 11
VIDEO FIELD 12
VIDEO FIELD 13        AUDIO FIELD 4/VSYNC 13
VIDEO FIELD 14
VIDEO FIELD 15
VIDEO FIELD 16
VIDEO FIELD 17        AUDIO FIELD 5/VSYNC 17

5,471,576

AUDIO/VIDEO SYNCHRONIZATION FOR APPLICATION PROGRAMS

BACKGROUND OF THE INVENTION

1. Field of the Invention

This invention relates to the field of data processing and, more particularly, to synchronization techniques for audio/video data streams from independent audio and video devices by application programs.

2. Description of Related Art

A multimedia system is designed to present various multimedia materials in various combinations of text, graphics, video, image, animation, sound, etc. Such a system is a combination of hardware and software. The hardware includes a personal computer or a network of personal computers to which various audio/video devices can be attached. The hardware runs under the control of an operating system and audio/video application programs.

Multimedia (audio/video) applications impose heavy demands on an operating system to move large amounts of data from device to device, from system memory to a device, or vice-versa, in a continuous, real-time manner. Personal computing systems processing audio/video applications must support a flexible, yet consistent, means for transporting these large data objects, and control this activity accurately in real time.

The ability to synchronize events is critical to successful multimedia applications execution. For example, the application author may decide to display a certain bitmap (e.g., an image of fireworks bursting) at precisely the same time as an audio waveform is played (e.g., a specific cymbals crash during the "Star Spangled Banner").

There are many video devices and audio devices available for attachment to personal computing systems, but they operate independently of each other. Many times there is a need to use one hardware adaptor type for motion video, and a second hardware adaptor type for audio, each with no prior knowledge of the other. Depending on the audio hardware design, the hardware provides substantially less interrupts, anywhere from $\frac{1}{10}$ of a second to several seconds between each interrupt. Some audio hardware designs do not provide an interrupt at set time intervals at all; instead, they provide an interrupt when a predetermined threshold is reached. In the above situations, the adapters are not designed for synchronization with each other. Further, developers of application programs desire the flexibility of adding audio and video hardware of any type, rather than just the hardware designed for use with a particular multimedia operating system.

SUMMARY OF THE INVENTION

It is an object of this invention to provide synchronization of independently developed audio and video hardware.

It is a further object of this invention to provide for synchronization of audio and video hardware independent of the operating system.

In accordance with this invention, these objects are accomplished by embedding a synchronization process in application programs to record audio fields with video synchronization marks, and to play back the audio and video fields in synchronism by tracking the video fields against the video sync marks in the audio fields. The video sync marks are video field counts, rather than actual synchronization marks. During recording of audio and video fields for the multimedia presentation, the ratio of video fields to audio fields, or the number of video fields for each audio field, is tracked by counting the video fields and recording the video field count as sync mark (VSYNC count) appropriate for each audio field. During playback, the system compares the count of video fields displayed against the VSYNC count in the audio field being played. If the counts are different, the system either skips video fields, or repeats video fields to bring the video fields into synchronism with the audio fields.

The great advantage of the invention is that it may be embedded in any application program, and used with any audio or video hardware. The invention allows the user to produce a multimedia presentation independent of the operating system and independent of the type of audio and video adapters in the system.

Other advantages and features of the invention will be understood by those of ordinary skill in the art after referring to the complete written description of the preferred embodiments in conjunction with the following drawings.

BRIEF DESCRIPTION OF THE DRAWING

FIG. 2 is a table illustrating the interrelation between the video fields and the VSYNC counts in the audio fields.

DETAILED DESCRIPTION OF THE PREFERRED EMBODIMENT PERSONAL COMPUTER SYSTEM

Figure 1:
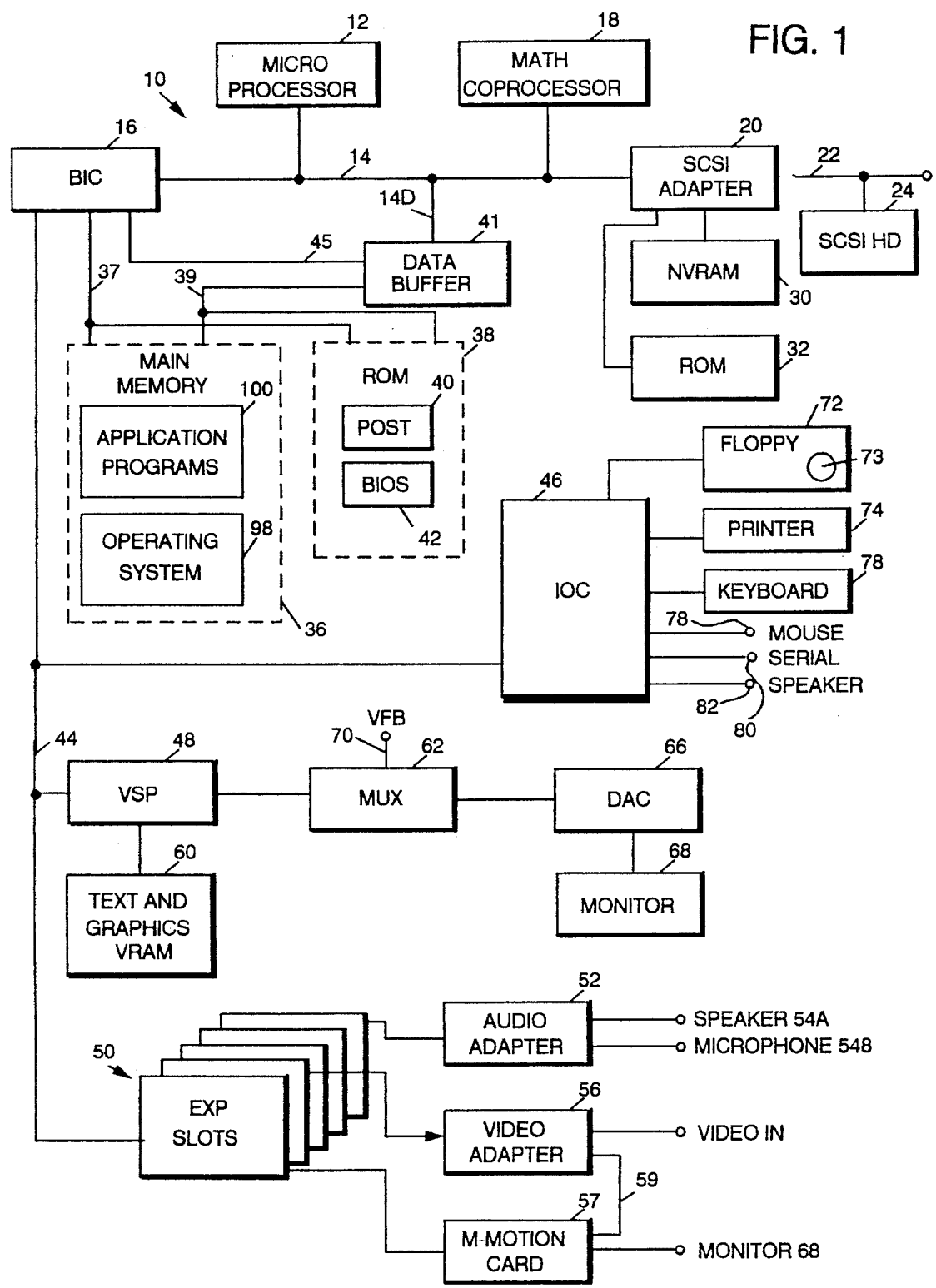
FIG. 1 is a block diagram of a data processing system embodying the invention.

Referring now to the drawings, and first to FIG. 1, there is shown an exemplary data processing system comprising a personal computer 10 operable under a multitasking operating system, such as OS/2, Version 2.0, to execute application programs. Computer 10 comprises a microprocessor 12 connected to a local bus 14 which, in turn, is connected to a bus interface controller (BIC) 16, a math coprocessor 18, and a Small Computer System Interface (SCSI) adapter 20. Microprocessor 12 is preferably one of the family of 80xxx microprocessors, such as an 80386 or 80486 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). Adapter 20 is also connected to a Non-Volatile Random Access Memory (NVRAM) 30, and to a Read Only Memory (ROM) 32.

BIC 16 performs two primary functions; one being that of a memory controller for accessing a main memory 36 and a ROM 38. Main memory 36 is a dynamic Random Access Memory (RAM) that stores data and programs for execution by microprocessor 12, and math coprocessor 18. ROM 38 stores a POST program 40 and BIOS 42. POST program 40 performs a standard power-on, self-test of the system when computer 10 is started by turning the power on, or by a keyboard reset. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel (MC) architecture. Bus 44 is further connected to an Input/Output Controller (IOC) 46, a Video Signal Processor (VSP) 48, and a plurality of expansion slots 50. VSP 48 is further connected to a Video RAM (VRAM) 60 and a Multiplexor (MUX) 62. VRAM 60 stores text and graphic information for controlling what appears on the screen of a monitor 68. MUX 62 is further connected to a Digital-To-Analog Converter (DAC) 66, and to a connector, or terminal, 70 that is connectable to a Video Feature Bus (VFB). DAC 66 is connected to monitor 68 that provides a conventional output screen, or display, for viewing by a user.

IOC 46 controls operation of a plurality of I/O devices, including a floppy disc drive 72 designated as the A:drive, a printer 74, and a keyboard 76. Drive 72 comprises a controller (not shown), and a removable floppy disc or diskette 73. IOC 46 also is connected to a mouse connector 78, a serial port connector 80, and a speaker connector 82, which allow various optional devices to be connected into the system.

Audio and/or video devices may be added to the system through the expansion slots 50. Audio adapter or audio card 52, in an expansion slot 50, interfaces the system to multimedia audio devices including speakers 54A, microphones 54B, or audio systems, including a combination of audio devices, such as mixers, amplifiers, microphones, speakers, etc. As shown in FIG. 1, audio adapter 52 receives commands and data from the system, and drives a speaker 54A. The speaker may be the same speaker as provided with the computing system, or an additional speaker or speaker system. Conversely, microphone 54B provides an audio signal for recording by the system.

The video adapter in the preferred embodiment uses two cards; the Video CODEC card 56, and the M-Motion card 57. Video CODEC card 56, in an expansion slot 50, interfaces the system to video source devices, such as video recorders, video cameras, etc, and also compresses and decompresses the video data to generate a composite video signal for the M-Motion card 57. "Video In" signal would be compressed and recorded in the system, or it could be passed on line 59 as a composite video signal to M-Motion card 57 for display on monitor 68. Recorded compressed video from the system would be decompressed and passed as a composite video signal to the M-Motion card 57 for display on monitor 68.

The M-Motion card 57 is a product of the IBM Corporation. The M-Motion card 57 card is inserted in an expansion slot 50. The card contains a video signal processor, text and graphics VRAM, and digital-to-analog converters. When monitor 68 is attached to the M-Motion Card 57, rather than the primary system connection at DAC 66, and a terminator plug is placed in the primary system connection at DAC 66, the M-Motion card replaces VSP 48 in the system. The video data then goes through the expansion slots to the CODEC card 56 and the M-Motion card 57.

SYNCHRONIZATION

Memory 36 stores various programs for execution in the system, which programs include application programs 100, including audio/video application programs, and an operating system 98. In the preferred embodiment, the operating system is a multi-tasking operating system, such as the Operating System/2 program. In a multimedia presentation, the audio and visual devices attached to the system must be synchronized. This is the task of the audio/visual synchronization programs embedded in the audio visual application programs. These synchronization programs are loaded into main memory 36, and run by microprocessor 12 using device drivers from the operating system, and driving the adapters 52 and 56 in expansion slots 50 through BIC 16.

In FIG. 2, a table is shown illustrating the timing relationship between video fields and audio fields that are to be synchronized for a multimedia display. The number of video fields displayed during each audio field varies from three to four. In accordance with the invention, the audio and video fields are first recorded under control of the program so as to append Video Sync (VSYNC) counts to each audio field. The audio fields occur less frequently than the video fields. As will be described hereinafter, the program in record mode starts the recording of audio and video fields substantially simultaneously. As each video field is recorded, the VSYNC is incremented by one. When each audio field is recorded, the current VSYNC count is appended to the audio field and recorded with it. Accordingly, in FIG. 2, audio field one is composed when video field three is composed. Therefore, audio field one has VSYNC 3 (count three) appended to, and recorded with it. The VSYNC counts appended to, and recorded with each audio field are shown in FIG. 2. Since the VSYNC counts are incremented once for each video field, the VSYNC counts appended to the audio field correspond to the video field number. During playback mode, the VSYNC counts are used by the present synchronization program to sync the audio and video threads in the application program, and thereby the audio/video presentation by the system.

Figure 3:
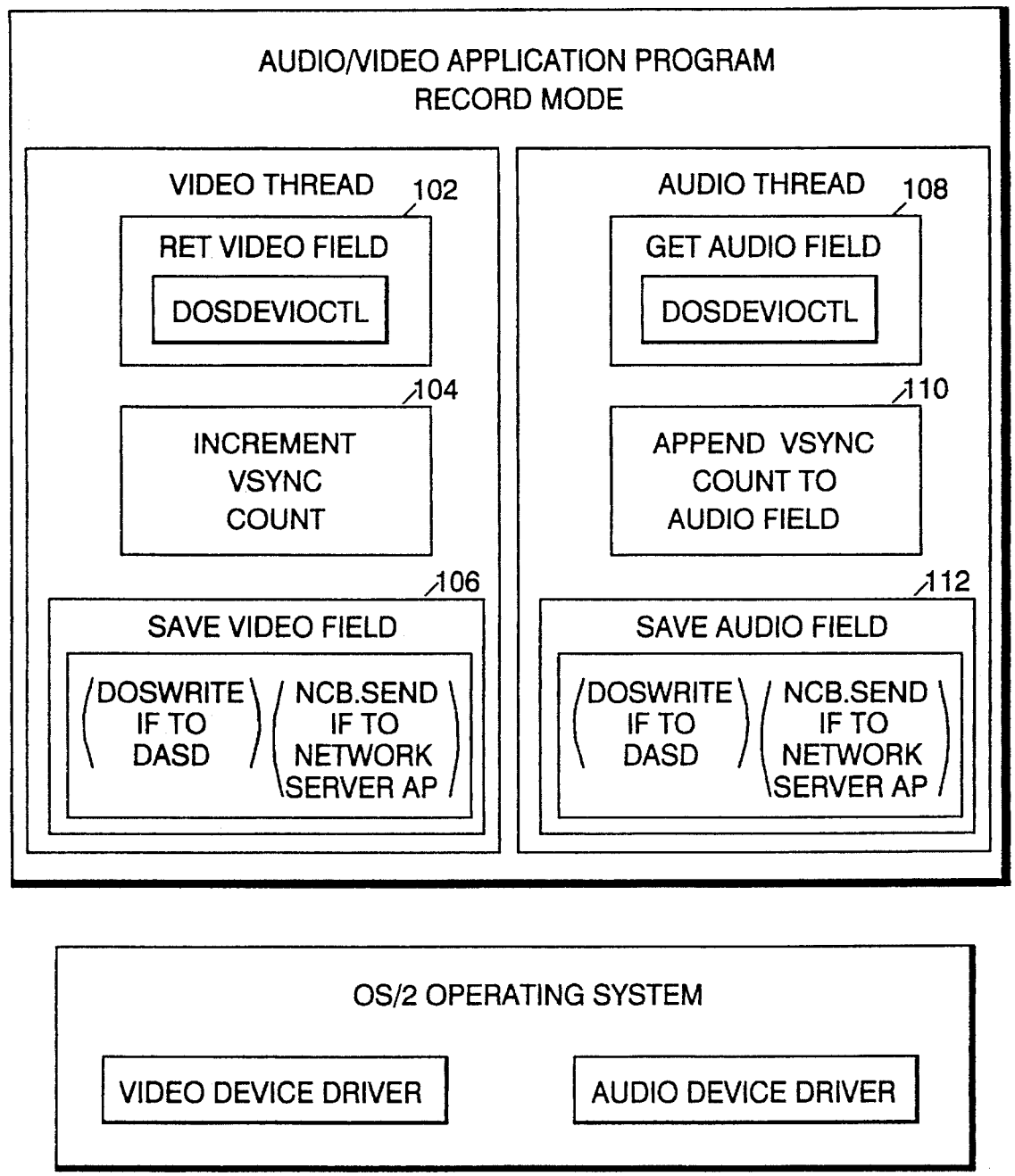
FIG. 3 illustrates the high level organization of the invention, and its operations or processes, during record mode.

In FIG. 3, the high-level content of processes performed by the audio thread and the video thread during record mode, as they run in the system, are shown. The processes are illustrated in detail in FIG. 6. At the high level in FIG. 3, the video thread in operation 102 gets a video field with the DosDevIOCtl command or call. Operation 104 increments the VSYNC count, and operation 106 saves the video field. In a personal computing system, the save is accomplished with a DosWrite command, and in a network the save is accomplished with an NCB.SEND command. In the former, the field is written to DASD (SCSI HD 24 in FIG. 1), while in the latter, the field is written by the network server application program. The sequence of operations 102, 104 and 106 repeat until all video fields have been recorded.

The audio thread in FIG. 3 at operation 108 gets an audio field with the DosDevIOCtl command. Operation 110 appends the VSYNC marker, or count, to the audio field, and operation 112 saves the audio field with the VSYNC count with the DosWrite command, or the NCB.SEND command, in the same manner as just described for the video thread. The sequence of operations 108, 110 and 112 repeat until all audio fields have been recorded.

To perform the get, send and save functions in FIGS. 3, 4, 5A and 5B, the audio and video threads must use the audio and video device drivers that are typically included in the operating system. For example, in the operation "Get Audio Field" during record mode, the microprocessor 12 would use DosDevIOCtl which would be interpreted by the audio device driver in transferring commands and data through BIC 16 between processor 12, memory 36, DASD (SCSI Hard Drive 24), and audio adapter 52.

Figure 4:
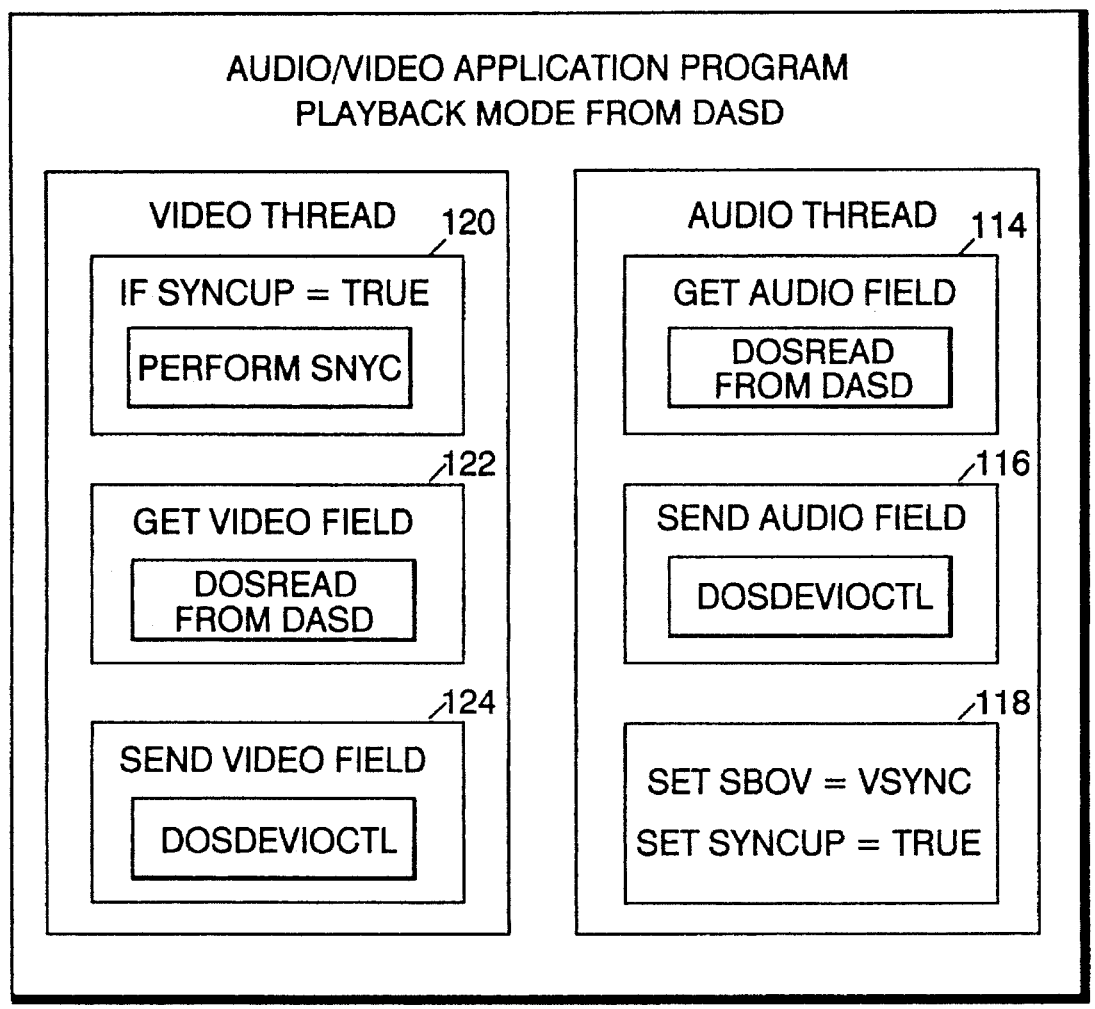
FIG. 4 illustrates the high level organization of the invention, and its operations or processes, during playback mode when reading fields from DASD.
Figure 4:
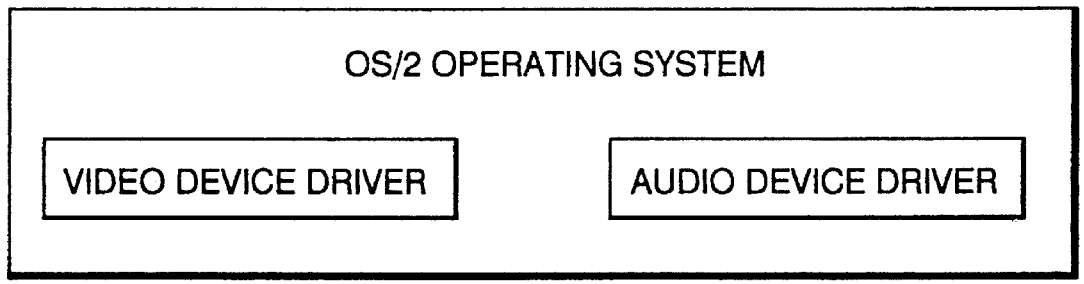
Figure 7:
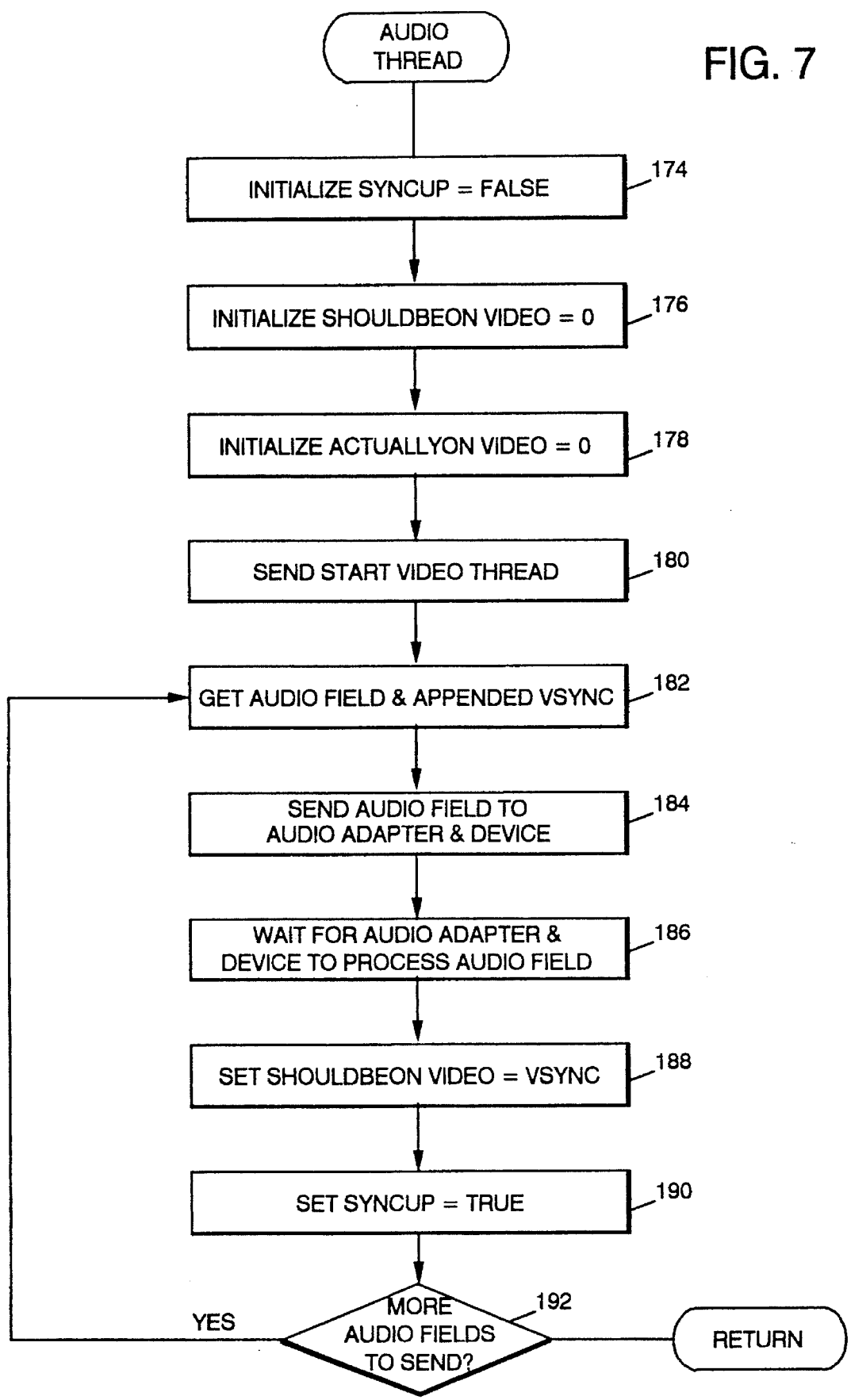
FIG. 7 shows the flow of operations, or process steps, for the audio thread of the invention during playback mode.
Figure 8A:
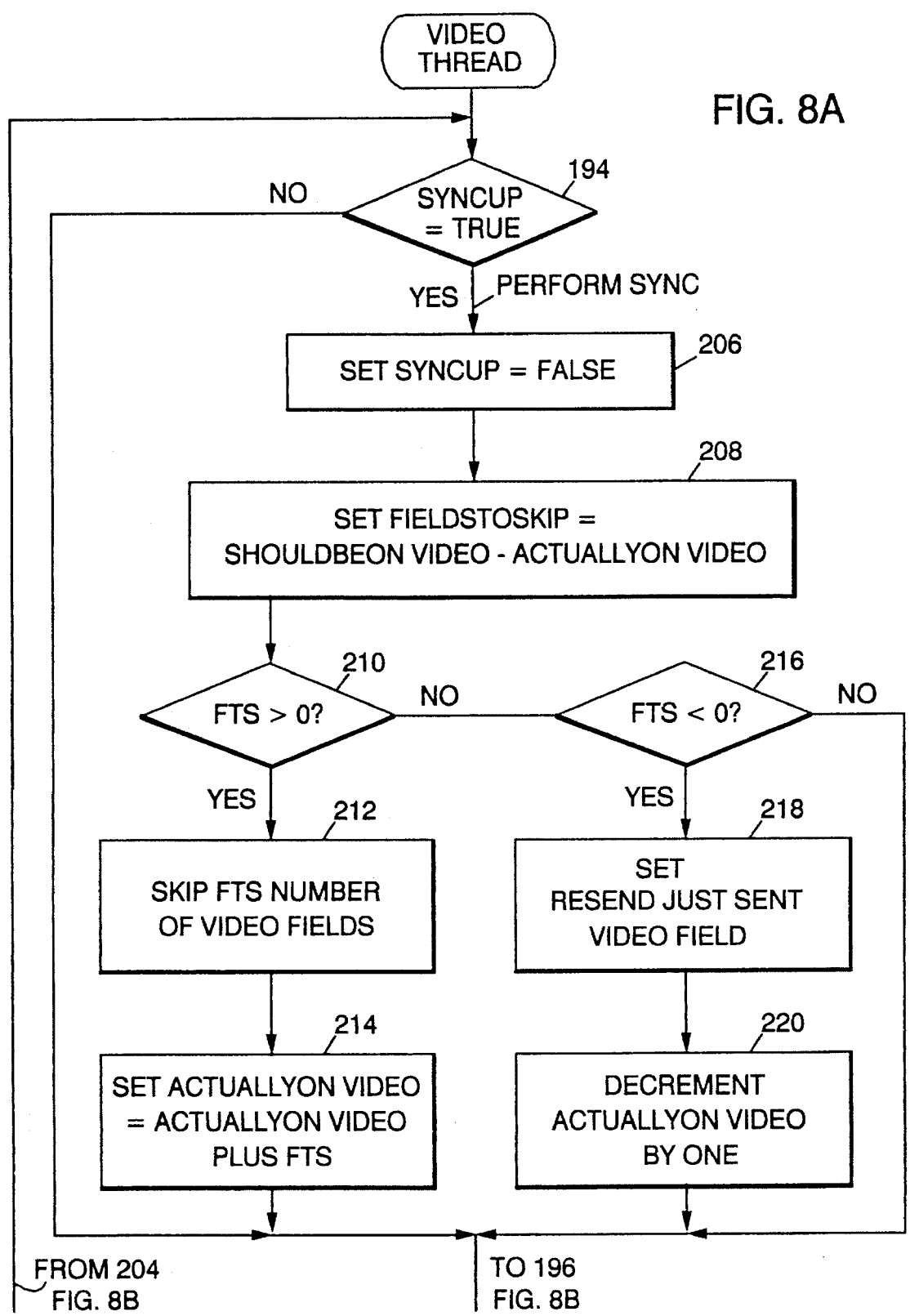
FIG. 8 shows the flow of operations, or process steps, for the video thread of the invention during playback mode.
Figure 8B:
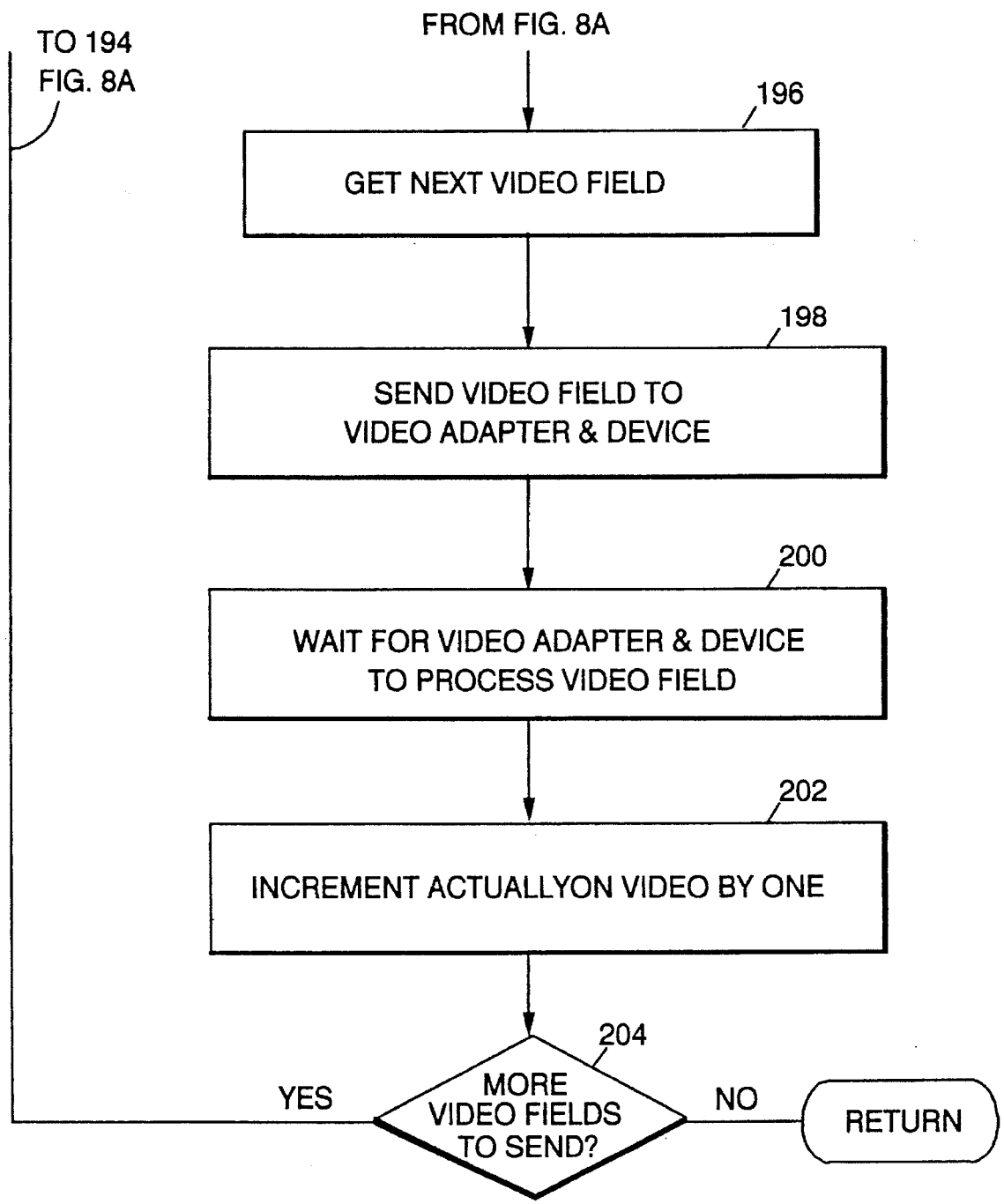

FIG. 4 illustrates the basic operations of the synchronization processes in the video and audio threads. FIGS. 7 and 8 shows the processes in detail. Also, FIG. 4 shows commands, or calls, used when the playback operation is performed from DASD in the computing system. In the audio thread, after initialization of the SyncUp flag, operation 114 gets the first audio field from DASD with a DosRead command. Operation 116 sends the audio field to audio adapter 52 (FIG. 1) with a DosDevIOCtl. After the audio field is processed at the audio hardware (adapter and audio device), operation 118 sets a ShouldBeOn Video (SBOV) value to the append VSYNC count, and sets the SyncUp flag TRUE. The SBOV value and VSYNC count will be used by the video thread to accomplish synchronization.

The video thread in FIG. 4 at operation 120 tests the SyncUp flag. If the flag is TRUE, the video thread performs the synchronization operation which is illustrated in FIG. 8, and described hereinafter. Operation 122 gets the video field from DASD with a DosRead command, and operation 124 uses the DosDevIOCtl command to send the video field to the CODEC card 56.

Figure 5A:
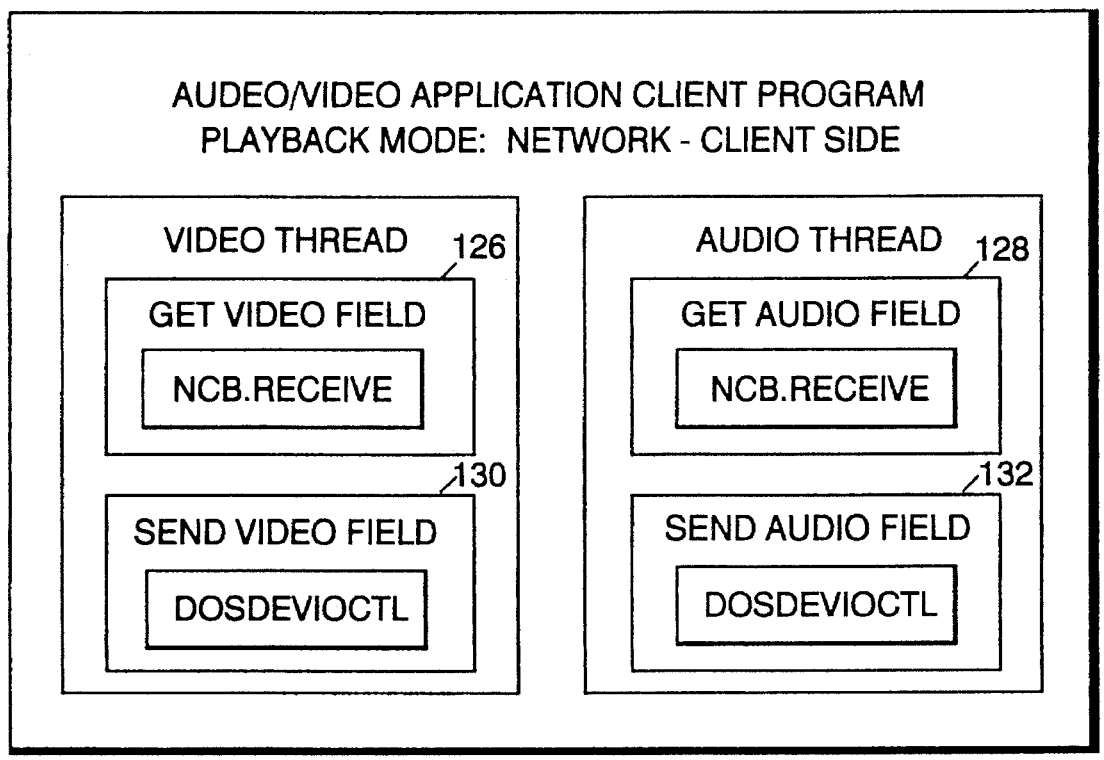
FIG. 5A illustrates the high level organization of the invention, and its operations or processes, during playback mode at the client in a network when receiving fields from the server.
Figure 5A:
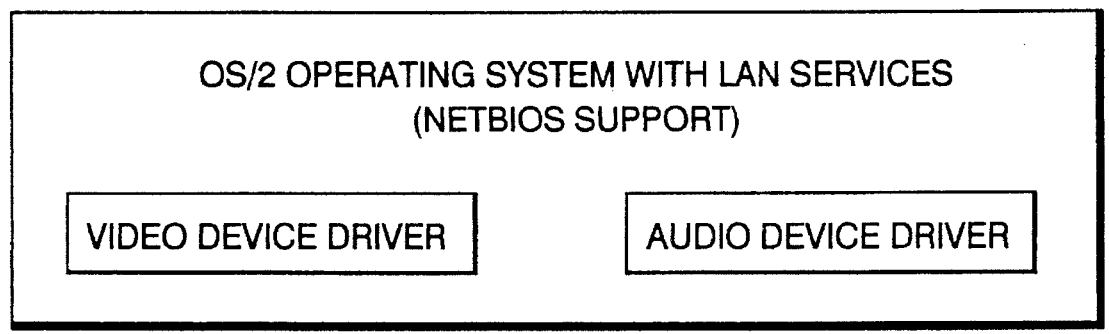
Figure 5B:
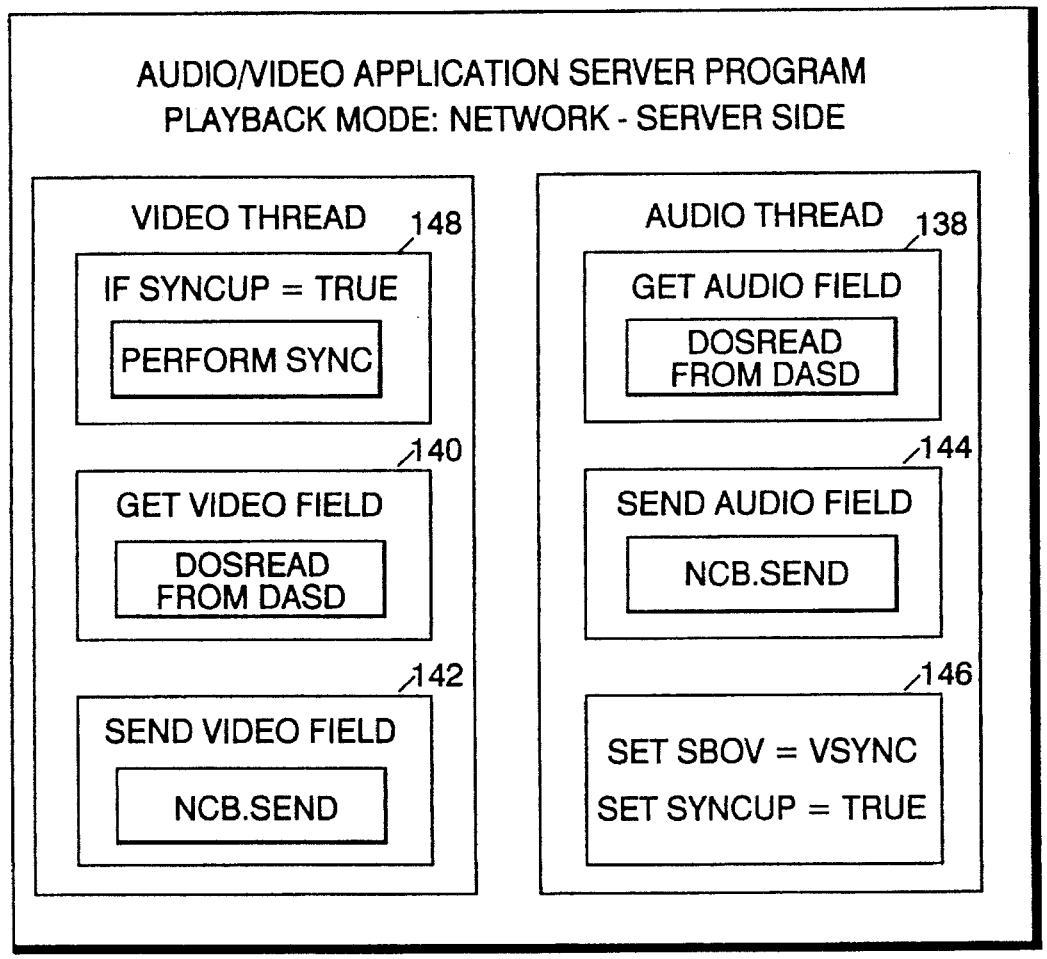
FIG. 5B illustrates the high level organization of the invention, and its operations or processes, during playback mode at the server in a network when sending fields from its DASD to the client.
Figure 5B:
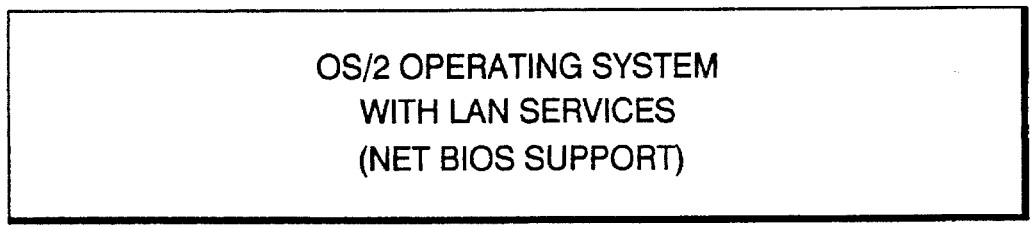

FIGS. 5A and 5B illustrate the same processes as FIG. 4, except that the system environment is a network. FIG. 5A shows the processes for the client personal computing system, and FIG. 5B shows the processes for the server personal computing system. In FIG. 5A, the client side, the "Get" operations 126 and 128 are implemented with the NCB.RECEIVE command. The "Send" operations 130 and 132 are implemented with DosDevIOCtl in the same manner as FIG. 4 because the multimedia presentation occurs as the client personal system. The client side in FIG. 5A does not have the test for SyncUp or the set SyncUp operations as the synchronization operations are performed at the server side.

In FIG. 5B, the server side, the Get operations 138 and 140 are performed with DosRead commands as the audio and video fields are stored in the server DASD. The Send operations 142 and 144 are performed with network commands NCB.SEND as the fields will be presented at the client (FIG. 5A). The Set operations 146 in the audio thread is the same as the Set operations 118 in FIG. 4. Likewise, the SyncUp test operation 148 is the same as the SyncUp test operation 120 in FIG. 4. The details of the record mode and playback mode to accomplish synchronization will now be described with reference to FIGS. 6, 7 and 8.

Figure 6:
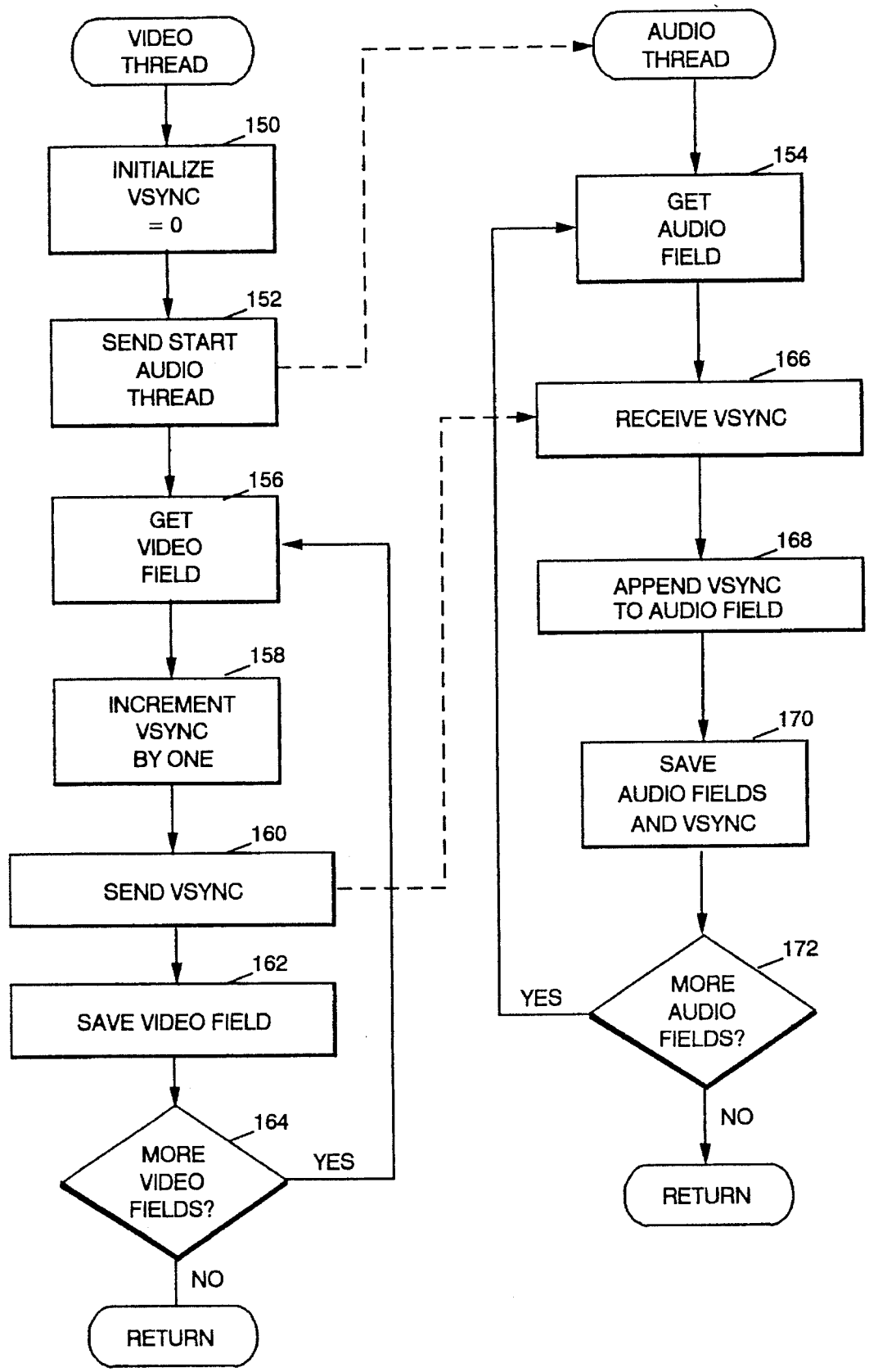
FIG. 6 shows the flow of operations, or process steps, for the audio and video threads of the invention during record mode.

During record mode, the audio adapter 52 (FIG. 1) and the CODEC card 56 (FIG. 1) will be receiving, or will have already received, audio and video signals. The signals will be converted to audio and video fields ready for recording in DASD. In FIG. 6, the record mode begins with the video thread initializing VSYNC to "0" at operation 150. Operation 152 sends a Start Audio Thread flag which triggers the audio thread in record mode. Audio thread starts its flow with operation 154 which gets the first audio field.

Meanwhile, the video thread, at operation 156, gets the first video field. Operation 158 in the video thread increments VSYNC by one so that the VSYNC count always matches the number of the video field. Operations 160 and 162 send the VSYNC count to the audio thread, and saves the video field, respectively. The VSYNC count is not appended to or recorded with the video field. Decision 164 tests for whether there are more video fields to be recorded. If there are more video fields, the process flows back to operation 156 to get the next video field. If all video fields have been recorded, the video thread in record mode is completed.

In the audio thread, operation 166 receives, or gets, the VSYNC count from the video thread when the first audio thread has been composed or pulled together for recording. As discussed previously in reference to FIG. 2, multiple video fields will be recorded for each audio field recorded. In FIG. 2, the first audio field is composed after three video fields have been composed. Accordingly, operation 166, in this example, would receive a VSYNC count=3. The VSYNC 3 mark is appended to the audio field by operation 168, and the first audio field with VSYNC 3 appended thereto is saved (recorded) by operation 170. Decision 172 tests for more audio fields. If there are more audio fields, the process flows back to operation 154 to get the next audio field. The audio thread continues until all audio fields have been recorded with an appended VSYNC count corresponding to the number of the video field the audio field is to be in synchronism with. When all audio fields are recorded, decision 172 branches to RETURN, and the audio thread in record mode is complete.

The process in playback mode begins with the audio thread as shown in FIG. 7. Operations 174, 176 and 178 are initialization operations for a sync operation flag, and variables used in the sync operation. These initialization operations set the SyncUp flag to FALSE, the ShouldBeOn Video (SBOV) count to "0" and the ActuallyOn Video (AOV) count to "0." After initialization, operation 180 sends the Start Video Thread flag to the video thread illustrated in playback mode in FIG. 8.

Operation 182 in FIG. 7, the audio thread in playback mode, gets the first audio field and its appended VSYNC count. In operation 184, the audio field is sent to the audio adapter, and thus the audio device attached to the adapter. When the audio field is completely processed by the audio adapter and audio device, a signal is sent by the adapter back to processor 12. Operation 186 waits for this signal and then passes the process flow to operation 188 when the signal is received. In operation 188, the SBOV variable is set equal to the VSYNC count. Operation 190 sets the SyncUp flag to TRUE. This will trigger the video thread in FIG. 8 to perform the synchronization process. Decision 192 tests whether there are more audio fields to be sent to the audio adapter. If there are more audio fields, the process branches back to operation 182 to get the next audio field. If all audio fields have been sent to the audio adapter, decision 192 branches to RETURN, and the audio thread in playback mode is complete.

In FIG. 8, the video thread in playback mode begins with decision 194 testing whether the SyncUp flag is TRUE or FALSE. Since the SyncUp flag is initialized to FALSE by operation 174 in the audio thread (FIG. 7), process flows to operation 196 which gets the first video field. Operation 198 then sends the video field to the video adapter (CODEC 56 and M-Motion card 57 in FIG. 1) and thus the video device for processing for presentation. When the processing is complete at the video hardware, a signal is sent back to processor 12. Wait operation 200 looks for the video field processed signal and then passes process flow to operation 202 when the signal is received.

In operation 202, the ActuallyOn Video (AOV) count is incremented by one. The AOV count tracks the number of video fields processed. Decision 204 then tests whether there are more video fields to be sent to the video adapter (cards 56 and 57). If there are more video fields to be presented, process flow branches back to decision 194. If SyncUp flag is still false, meaning there is no audio field process complete yet and thus no need to perform a sync operation, the process returns to operation 196 to get the next video field. This loop continues processing video fields until an audio field is processed by the audio thread in FIG. 7.

The perform sync loop in FIG. 8 is triggered by SyncUp flag being switched to TRUE by operation 190 (FIG. 7) in the audio thread. The process then branches to operation 206, which resets the SyncUp flag to FALSE. With SyncUp reset to FALSE, the process will perform only one synchronization operation per audio field. In operation 208, the FieldsToSkip (FTS) variable is set to the difference between the SBOV count and the AOV count. The SBOV count was set to the VSYNC count in operation 188 (FIG. 7) of the audio thread. The AOV count, as incremented in operation 202, is the count of video fields processed. Therefore, FTS calculated in operation 208, is the number of video fields that the video presentation is ahead of, or behind, the audio presentation.

Decision 210 tests for a positive FTS count, i.e., the number of video fields that the video presentation is behind the audio presentation. If FTS>0, then operation 212 skips the number of video fields in the FTS count. In other words, operation 196, which gets the next video field, is told to skip the number of video fields equal to the FTS count. In operation 214, the AOV count is incremented by the FTS count. This will update the AOV count, and keep it on track with the number of the last video field processed (or skipped). If FTS is not>0, the process flows to decision 216.

Decision 216 tests for a negative FTS count, i.e., the number of video fields that the video presentation is ahead of the audio presentation. If FTS is not<0, FTS must be equal to 0. In other words, the video and audio fields are synchronized. In this event, the process flows to operation 196 to get the next video field.

If FTS is<0, then the video presentation is ahead of the audio presentation by the number of video fields equal to the FTS count. In the preferred embodiment, the interval between sync operations is such that FTS is not expected to be more negative than −1. Accordingly to achieve synchronization, the last video field sent is repeated. Operation 218 accomplishes this by setting the next video field to the Just sent video field. Thus, operation 196 will get the just sent video field, and send it again. Operation 220 decrements the AOV count by one. This updates the AOV count so that it corresponds to the number of the last processed video field.

It will be appreciated by one skilled in the art that if the system was such that the video presentation could get more than one video field ahead, then the just sent field could be repeated the number of times equal to the FTS negative count. Of course, AOV count must be decremented by one each time the just sent video field is repeated.

As described above and shown in FIG. 8, the synchronization operation is completed when the process gets back to operation 196. Sync completion may be the result of (1) being in sync, process branches from decision 216, (2) video behind, process flows from operation 214, or (3) video ahead, process flows from operation 220.

While a number of preferred embodiments of the invention have been shown and described, it will be appreciated by one skilled in the art, that a number of further variations or modifications may be made without departing from the spirit and scope of my invention.

What is claimed is:

1. In a computing system running a multi-threaded audio/visual application program, a synchronization method embedded in the application program for synchronizing an audio thread with a video thread in the application program, said audio and video threads processing respectively audio fields and video fields for playback through audio and video adapters attached to the computing system, said method comprising the computer implemented steps of:

storing the video fields, the audio fields, and a sync count with each audio field, each audio field sync count identifying the video field that the audio field is to be in synchronism with during playback;

in the audio thread, controlling the processing of each audio field stored in the system and sending a sync flag and the sync count as a sync value to the video thread;

in the video thread, controlling the processing of each video field stored in the system and counting the video fields as they are processed to provide an actual video field count;

in the video thread, comparing the sync value from the audio thread with the actual video field count and said controlling step in the video thread synchronizing the playback of the audio fields and video fields by continuing the processing of video fields until the actual video field count matches the sync value.

2. The method of claim 1 wherein said storing step comprises the steps of:

starting the video thread and the audio thread so that the computing system is operating the audio thread and the video thread in parallel to store audio and video fields of an audio/video presentation;

in the video thread, getting each video field of the presentation and saving each video field in the computing system for subsequent playback in the audio/visual presentation;

in the video thread, counting the video fields as they are saved by said saving step and sending to the audio thread a sync count for each video field as the video field is saved; and the audio thread, getting each audio field of the presentation and saving the audio field with the sync count of the video field that the audio field is to be in synchronism with during playback.

3. The method of claim 1 wherein said comparing step computes a difference between the sync count and the actual video field count.

4. The method of claim 3 wherein said synchronizing step by said controlling step in the video thread comprises the steps of:

getting the next video field for processing and playback if the difference is zero;

repeating a video field if the difference indicates the processed video field is played back prior to the processed audio field to be synchronized with the video field; and skipping video fields if the difference indicates the processed video field is played back after the processed audio field to be synchronized with the video field.

5. In a computing system for generating audio/visual presentations, an apparatus for synchronizing the playback of video data fields with audio data fields, said computing system having a processor, storage devices, an audio adapter with an audio device for playing back audio fields, and a video adapter with a video device for playing back video fields, said apparatus being driven by an audio/visual computer program running on the computing system and said apparatus comprising:

first means for getting and saving a sequence of video fields in the computing system for subsequent playback in an audio/visual presentation;

second means for retrieving an audio field at the same time said first means is getting and saving video fields, said audio field to accompany the sequence of video fields during the playback of the audio/visual presentation;

third means for counting each video field, as the video field is stored by said second means and for sending a sync count to said second means as each video field is stored by said first means;

fourth means responsive to the sync count from said third means for appending the sync count to the audio field retrieved by said second means and for saving the audio field with the appended sync count in the computing system for subsequent playback with the sequence of audio fields in the audio/visual presentation;

audio sending means for sending a sequence of audio fields stored in the system to the audio adapter for playback;

video sending means for sending the sequence of video fields stored in the system to the video adapter for playback;

means for synchronously starting said audio sending means and said video sending means;

means for counting the video fields as each video field is processed at the video adapter for playback and providing an actual count of processed video fields;

said audio adapter providing an audio completed signal after each audio field has been processed by the adapter;

means responsive to the audio completed signal for comparing the sync count of the processed audio field with the actual count from said counting means of the processed video field; and means for synchronizing the playback of the audio fields and video fields based on a comparison of the sync count of the processed audio field with the actual count.

6. The apparatus of claim 5 wherein said synchronizing means comprises:

next video means for getting a next video field for said video sending means if the sync count and the actual count compare equal;

repeat means for getting the most recently processed video field for said video sending means if the actual count is greater that the sync count; and means for skipping a number of video fields and said next video means getting a next field after the skipped video fields for the video sending means if the actual count is greater that the sync count.

7. The apparatus of claim 5 wherein said comparing means comprises:

means for subtracting the actual count from the sync count and providing a skip field count;

means for testing whether the skip field count is positive, negative or zero.

8. The apparatus of claim 7 wherein said synchronizing means comprises:

next video means for getting a next video field for said video sending means if the skip field count is zero;

repeat means for getting the most recently processed video field for said video sending means if the skip field count is negative;

means for skipping a number of video fields equal to the skip field count if the skip field count is positive;

said next video means getting a next field after the skipped video fields for the video sending means.

9. In a computing system for generating audio/visual presentations, an audio/visual-synchronizer for synchronizing the playback of video data fields with audio data fields, said computing system having a processor, storage devices, an audio adapter with audio device for playing back audio fields, and a video adapter with video device for playing back video fields, and said synchronizer comprising:

the processor operating with said storage devices for synchronously recording said video fields and said audio fields and appending to each audio field a sync count equal to a video field count, said video field count is equal to the number of video fields recorded when said processor records each video field at a storage device;

the processor initiating an audio/visual presentation by operating with the storage devices and the audio and video adapters to retrieve concurrently a sequence of audio fields with appended sync counts for the audio adapter and a sequence of video fields for the video adapter;

the audio adapter processing for presentation through the audio device each audio field retrieved by the processor;

the video adapter processing for presentation through the audio device each video field retrieved by the processor;

the video adapter providing a video completed signal after each video field has been processed by the video adapter;

the processor incrementing an actual count in response to each video completed signal;

the audio adapter providing an audio completed signal after each audio field has been processed by the audio adapter;

the processor responsive to the audio completed signal for comparing the sync count of the processed audio field with the actual count of the processed video field; and the processor synchronizing the retrieval of the audio fields and video fields for processing at the audio adapter and video adapter at each occurrence of the audio completed signal.

10. The synchronizer of claim 9 wherein the synchronous recording structure comprises:

the processor operating with storage devices for getting and saving a sequence of video fields in the computing system for subsequent playback in an audio/visual presentation;

the processor operating with storage devices for retrieving and saving audio fields in parallel with the processor operating with the storage devices to get and save video fields;

the processor for counting each video field to generate a sync count, as the video field is saved, and for appending the sync count to each audio field when the audio field is saved.

11. The synchronizer of claim 10 wherein said synchronizing structure comprises:

the processor for getting a next video field for processing by the video adapter if the sync count and actual count compare equal;

the processor for getting the most recently processed video field for the video adapter if the actual count is greater that the sync count; and the processor for skipping a number of video fields and getting a next field after the skipped fields for the video adapter if the actual count is greater that the sync count.

12. The synchronizer of claim 9 wherein said comparing structure comprises:

the processor for subtracting the actual count from the sync count and providing a skip field count;

the processor for testing whether the skip field count is positive, negative or zero.

13. The synchronizer of claim 12 wherein said synchronizing structure comprises:

the processor for getting a next video field for the video adapter if the skip field count is zero;

the processor for getting the most recently processed video field for the video adapter if the skip field count is negative;

the processor for skipping a number of video fields equal to the skip field count if the skip field count is positive;

the processor for getting a next field after the skipped video fields for the video adapter.

* * * * *